US 8,924,867 B2

United States Patent
Arnold

(10) Patent No.: US 8,924,867 B2
(45) Date of Patent: Dec. 30, 2014

(54) WEB INTERFACE FOR REMOTE PLATFORM BUILD

(75) Inventor: Gerald Arnold, Neuenhagen (DE)

(73) Assignee: SAP SE, Walldorf (DE)

(*) Notice: Subject to any disclaimer, the term of this patent is extended or adjusted under 35 U.S.C. 154(b) by 1073 days.

(21) Appl. No.: 12/943,205

(22) Filed: Nov. 10, 2010

(65) Prior Publication Data
US 2012/0117491 A1    May 10, 2012

(51) Int. Cl.
G06F 3/00 (2006.01)
G06F 17/30 (2006.01)
G06F 9/45 (2006.01)

(52) U.S. Cl.
CPC ............ *G06F 17/30893* (2013.01); *G06F 8/41* (2013.01)
USPC .......................................... 715/760; 715/762

(58) Field of Classification Search
USPC .......................................... 715/760, 762, 740
See application file for complete search history.

(56) References Cited

U.S. PATENT DOCUMENTS

| 2003/0037076 A1* | 2/2003 | Bravery et al. ............... 707/517 |
| 2008/0140779 A1* | 6/2008 | Ahn et al. ..................... 709/205 |
| 2008/0222213 A1* | 9/2008 | Arai .............................. 715/234 |
| 2011/0191366 A1* | 8/2011 | Eustace et al. ................ 715/752 |

OTHER PUBLICATIONS

"Imake—C preprocessor interface to make utility", retrieved date Nov. 10, 2010, download from http://www.mksoftware.com/docs/.../imake.1.asp, 3pgs.

S. I. Feldman, "Make—A Program for Maintaining Computer Programs", Aug. 15, 1978, Bell Laboratories, (Abstract 1 + pp. 1-8, 9 pages total).

"Make—maintain program-generated and interdependent files", retrieved date Nov. 10, 2010, download from http://www.mksoftware.com/docs/.../imake.1.asp, 20pgs.

"5.2 VMAKE", retrieved date Nov. 10, 2010, download from http://www.iue.tuwien.ac.at/.../node39.html, 2pgs.

* cited by examiner

*Primary Examiner* — Weilun Lo
*Assistant Examiner* — Truc Chuong
(74) *Attorney, Agent, or Firm* — Buckley, Maschoff & Talwalkar LLC

(57) ABSTRACT

A system may include reception of a request from a Web browser identifying source code and a computing platform, creation of a build environment corresponding to the identified computing platform, executing a build based on the source code, using the second build environment, to create build output, and transmission, to the Web browser, of a Web page including the build output.

10 Claims, 13 Drawing Sheets

US 8,924,867 B2

WEB INTERFACE FOR REMOTE PLATFORM BUILD

BACKGROUND

A computer executes software applications to provide users with desired computing functions. Software developers create such software applications by generating source code within a development environment. A development environment typically consists of a suite of software tools executing within a development workstation. A development workstation operates upon a particular computing platform, typically defined by its processor type and operating system.

After generating source code, a developer compiles the source code within a build environment of the computing platform. Compilation creates object files which are then linked together within the build environment to form a software application. This process also creates an output file which the developer may examine to identify compilation errors, etc. If errors occur during building of the software application, the developer may investigate the errors by viewing a directory structure of the build environment and/or log files generated during the build.

The software developer cannot be certain that a build will proceed properly on other computing platforms, even those which are similar to the computing platform of the development environment. To address the foregoing, a software developer may create a build environment within each computing platform on which the software application is intended to run. The software developer then builds the software application based on the source code within each build environment and inspects the resulting output files, log files and/or directory structure.

The foregoing approach is time- and resource-intensive. Systems are desired to facilitate building of software applications on different computing platforms. Such systems may also facilitate evaluation of the completed build.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
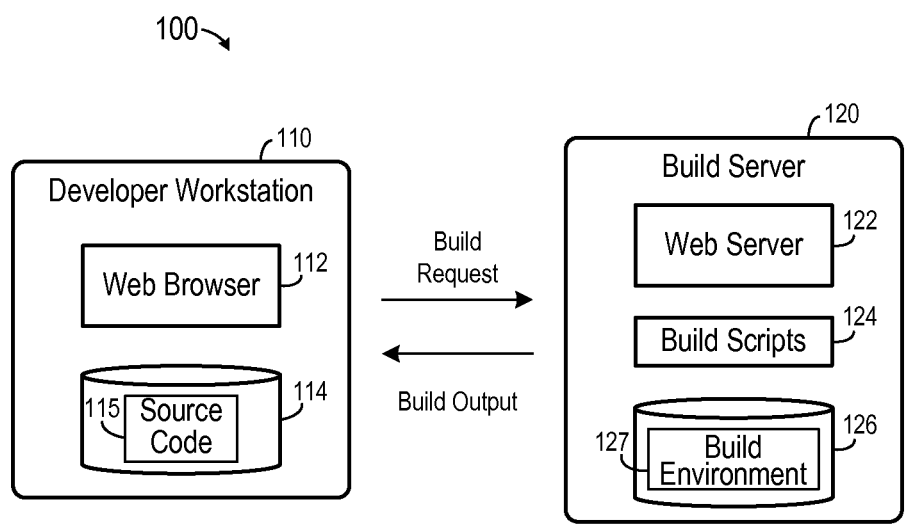
FIG. 1 is a block diagram of a system according to some embodiments.

FIG. 1 is a functional block diagram of system 100 according to some embodiments. Embodiments are not limited to system 100 and/or to the following description thereof. Each element of system 100 may be implemented by any suitable combination of hardware (e.g., one or more processors) and/or software (e.g., processor-executable program code). System 100 may include elements in addition to those illustrated, and some embodiments may omit one or more elements of system 100.

System 100 includes developer workstation 110 and build server 120. According to some embodiments, developer workstation 110 is a desktop computing system storing and executing software applications to perform the functions attributed below to developer workstation 110. Similarly, build server 120 may be a computer server storing and executing software applications to perform the functions attributed thereto herein.

Developer workstation 110 executes program code to invoke Web browser 112. Web browser 112 issues requests for data and/or functionality, and presents received data. These requests may conform to various Web-supported protocols, including but not limited to Hypertext Transfer Protocol (HTTP) and File Transfer Protocol (FTP). Web browser 112 may present Web pages written in Hypertext Markup Language (HTML) and including text, images, audio, video, and XML files, and may also execute plug-ins to support Flash applications and Java applets.

Memory system 114 of workstation 110 may comprise any one or more electronic data storage systems that is or becomes known. Non-exhaustive examples of such storage systems include a hard disk, a Flash drive, a CD-ROM, a DVD-ROM, and a Random Access Memory (RAM). Memory system 114 stores source code 115.

Source code 115 may conform to any computer programming language. Source code 115 may have been generated by a developer using development tools (not shown) executing on developer workstation 110. In some embodiments, source code 115 was created elsewhere and later stored within memory system 114.

Build server 120 executes program code to invoke Web server 122. Web server 122 receives and fulfills requests for data and/or functionality as described below. These requests may conform to any Web-supported protocol, and may result in transmission of a Web page to the requestor.

Web server 122 may invoke build scripts 124 to perform some of the functions described herein. Build scripts 124 include executable code to perform various functions related to the building of software based on source code. These functions may include unpacking source code, translating the source code into object files, and linking the object files into an executable file. Build scripts 124 may call appropriate "make" tools to provide these functions according to some embodiments.

Memory system 126 stores computing environment 127. Computing environment 127 includes data and structures used during software builds. Computing environment 127 may also include data generated by the build process.

According to some embodiments, developer workstation 110 is based on a first computing platform and build server 120 is based on a different computing platform. Build server 120 may therefore be operated to build software based on source code 115 on the different computing platform. In this regard, build scripts 124 may provide functions which are appropriate for the computing platform of build server 120.

Although the devices of system 100 are depicted as communicating via dedicated connections, it should be understood that all illustrated devices may communicate to one or more other illustrated devices through any number of other public and/or private networks, including but not limited to the Internet. Two or more illustrated devices may be located remote from one another and may communicate with one another via any known manner of network(s) and/or a dedicated connection.

Figure 2:
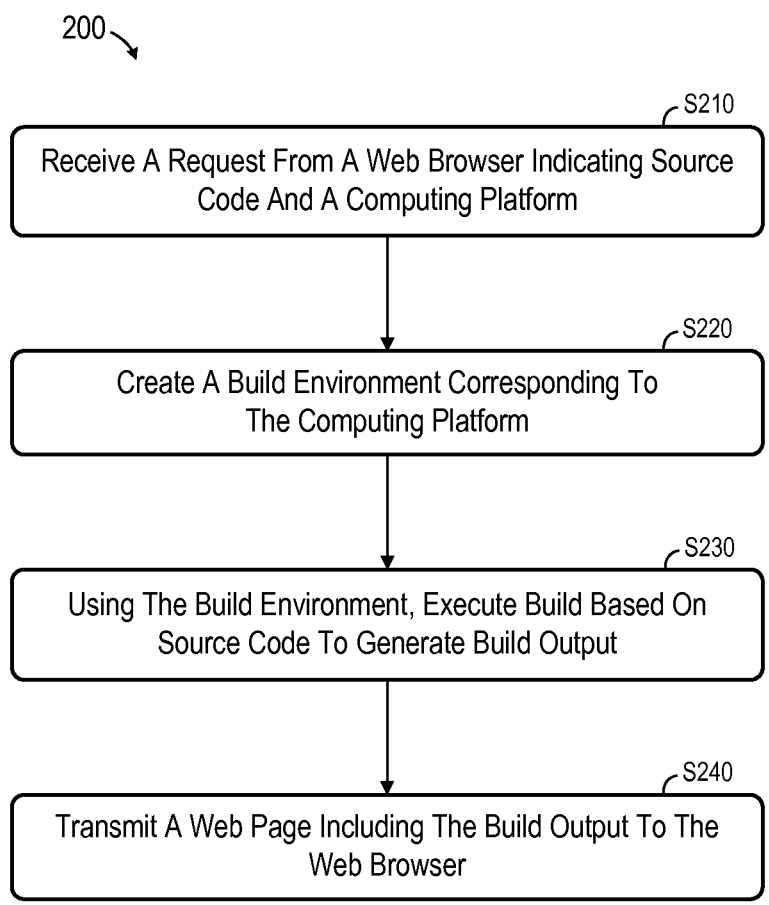
FIG. 2 is a flow diagram of a process according to some embodiments.

FIG. 2 is a flow diagram of process 200 according to some embodiments. Process 200 may be used in some embodiments to facilitate source code compilation. Process 200, and all other processes described herein, may be embodied in program code stored on a non-transitory computer-readable medium and/or performed by a computing device in response to execution of program code by a processor of the computing device, but embodiments are not limited thereto.

Initially, at S210, a request is received from a Web browser. The request indicates source code and a computing platform. The request may comprise an HTTP request issued by a Web browser such as Web browser 112 executing on workstation 110. In accordance with World Wide Web protocols, the request might not be received directly from the Web browser at S210. Rather, the request may be generated and transmitted by the Web browser, and may travel through other Internet-connected devices until being received at its intended destination at S210.

The request may comprise a request to compile the indicated source code on the indicated computing platform. The source code may comprise one or more files written in any programming language(s). The request may include a path to the one or more files within workstation 110. The computing platform may be indicated by the request using any suitable identifiers. For example, the request may indicate a processor type and operating system.

According to some embodiments, the destination of the request indicates the computing platform. For example, the request may indicate Web server 122 as its intended destination. The request thereby indicates the computing platform on which Web server 120 is executing (i.e., the computing platform of build server 120).

A developer may generate the request on a client device (e.g., developer workstation 110) from a command line of an operating system shell. Assuming that the request is to be generated by an application named "webmake", a developer may enter the command:
>webmake <platform> <module or makefile>,
where <platform> indicates a computing platform and <module or makefile> indicates the source code. More particularly, a module is a file of source code, while a makefile is a file of dependency lines. Each dependency line defines a target and a set of zero or more source code files on which the target depends. Each dependency line is followed by lines of tab-indented text which define how to transform the source code files into the target.

The webmake application is then executed to generate a request based on the command. In some embodiments, the webmake application may first identify a build server which executes the indicated computing platform. The webmake application then invokes a Web browser to transmit a request to a Web server of the build server.

Figure 3:
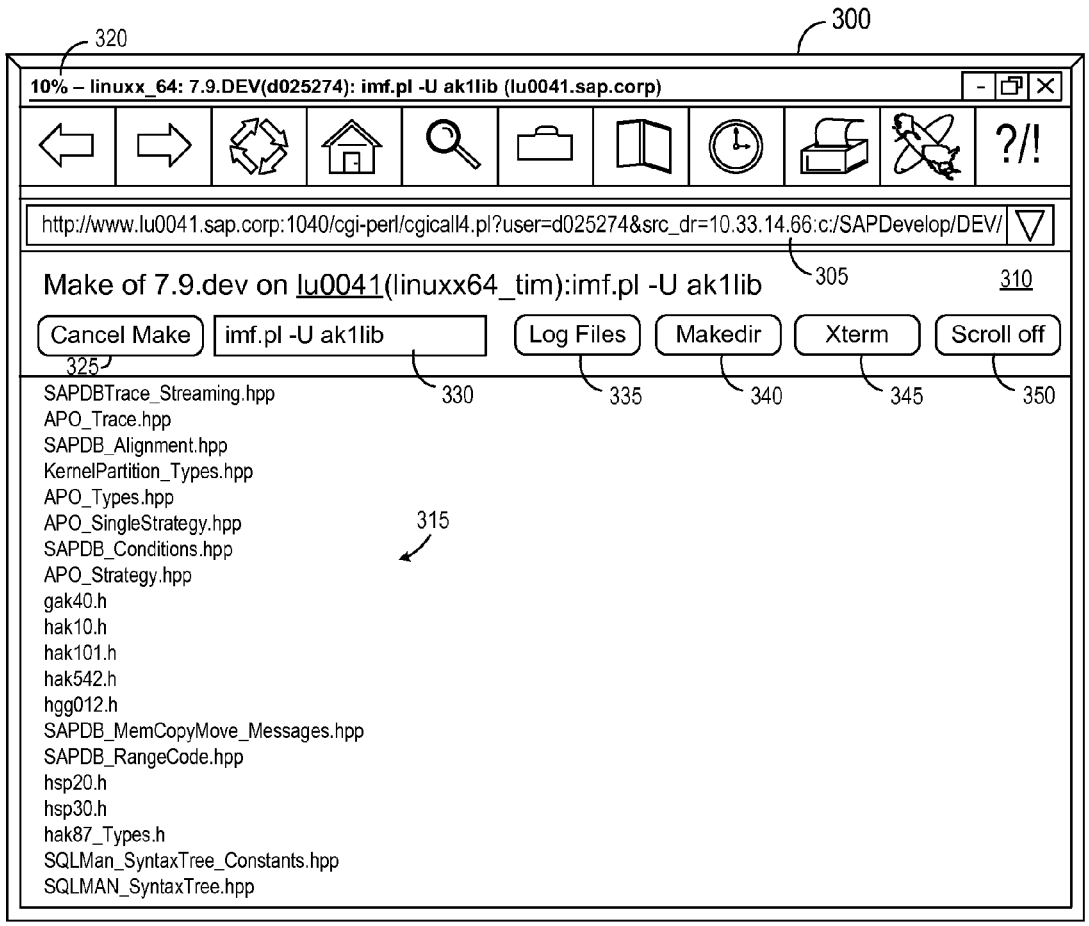
FIG. 3 is a view of a Web page including build output and displayed by a Web browser according to some embodiments.

FIG. 3 is an outward view of interface 300 of Web browser 112 according to some embodiments. Embodiments are not limited to the interfaces or Web pages shown in FIGS. 3 through 11 and 13.

In the example of FIG. 3, it is assumed that a developer has entered the command "webmake linuxx64 ak1lib" on the command line. Accordingly, the computing platform is "linuxx64" and the makefile is "ak1lib". Address bar 305 of interface 300 illustrates the resulting request according to some embodiments.

The request identifies a Web server executing on the computing platform (i.e., "1u0041.sap.corp"). The request uses the Common Gateway Interface (CGI) protocol to indicate a location of the source code to be compiled (i.e., "src_dr=10.33.14.66:C:/SAPDevelop/DEV/"). The request also uses CGI to identify the developer (i.e., "d025274") from whom the command was received. CGI facilitates the transmission of data to a Web server, at which the data may be processed using CGI scripts. Any other system for providing these functions may be employed in some embodiments.

In some embodiments, the request may be created through Web browser 112 without using a command line. For example, a developer may identify Web server 122 as being associated with a desired computing platform and may possess a suitable hyperlink (e.g., a bookmark) for submitting a compilation request to Web server 122. The developer operates Web browser 112 to request a Web page of Web server 122 which corresponds to the hyperlink, receives the Web page therefrom, and displays the Web page. The developer then inputs an indicator of source code files and any other suitable information into the Web page and selects a hyperlink on the page to submit the input information (e.g., via CGI) to Web server 122.

After the request is received at S210, a build environment corresponding to the computing platform is created at S220. For example, build server 120 may execute build scripts 124 (e.g., CGI scripts) to create build environment 127 in memory system 126. Build environment 127 includes a build directory in which files associated with the build are stored.

The build is executed based on the source code using the build environment at S230. Execution of the build generates build output, as well as resulting software. Any suitable build process may be employed at S230. Generally, building includes translating source code module files to object files, and linking the object files. The translating and linking may be performed based on description files.

In a particular example, appropriate ones of build scripts 124 are selected to process source code based on their programming language. Build scripts 124 may be platform-specific, and may call platform-specific unpacking, translating and linking tools (e.g., vmake tools, make tools, nmake tools) which are hosted by build server 120. According to some embodiments, development workstation 110 executes a server (e.g., vmakserv) through which the unpacking tools of build server 120 may extract the source code. Makefiles and sources are located on development workstation 110 and copied to build server 120 by a buildtool (e.g., vmake). This can be handled by a corresponding server (e.g., vmakserv) executing on development workstation 110 or on another access mechanism, including but not limited to a windows share (e.g., a public windows share on developer workstation 110 which can be accessed from Unix via SAMBA) or a mount point.

Appropriate translating tools are then called to produce object files and include files, which are stored in the build directory of build environment 127. Build scripts 124 may then call platform-specific linking tools to perform linking on the object files and include files based on link descriptions.

The build output is transmitted to the requesting Web browser at S240. For example, Web server 122 may create a Web page including the build output and may transmit the Web page to Web browser 112. S240 may be executed before S230 is complete. For example, the build output may be transmitted to the Web browser during compilation, to provide substantially real-time monitoring of the compilation.

Interface 300 of FIG. 3 illustrates Web page 310 including build output 315 according to some embodiments. Web server 122 returns Web page 310 to Web browser 112 in response to the request shown in address bar 305. Build output 315 may comprise any type of build output that is or becomes known.

Interface 300 also includes status indicator 320. Status indicator 320 indicates that the build is 10% complete. Accordingly, Web page 310 was transmitted at S240 during the build at S230. Web page 310 also includes Cancel Make button 325. A developer may select button 325 to instruct Web server 122 stop the build.

Web page 310 also includes field 330 showing the command being executed by build scripts 124. Button 335 may be selected to request a Web page including log files associated with the compilation, and button 340 may be selected to request a Web page including links for browsing the build directory (e.g., the $OWN directory) of build environment 127. Selection of button 345 opens a terminal session with build environment 127, and button 350 controls the scrolling of output 315 within Web page 310.

Figure 4:
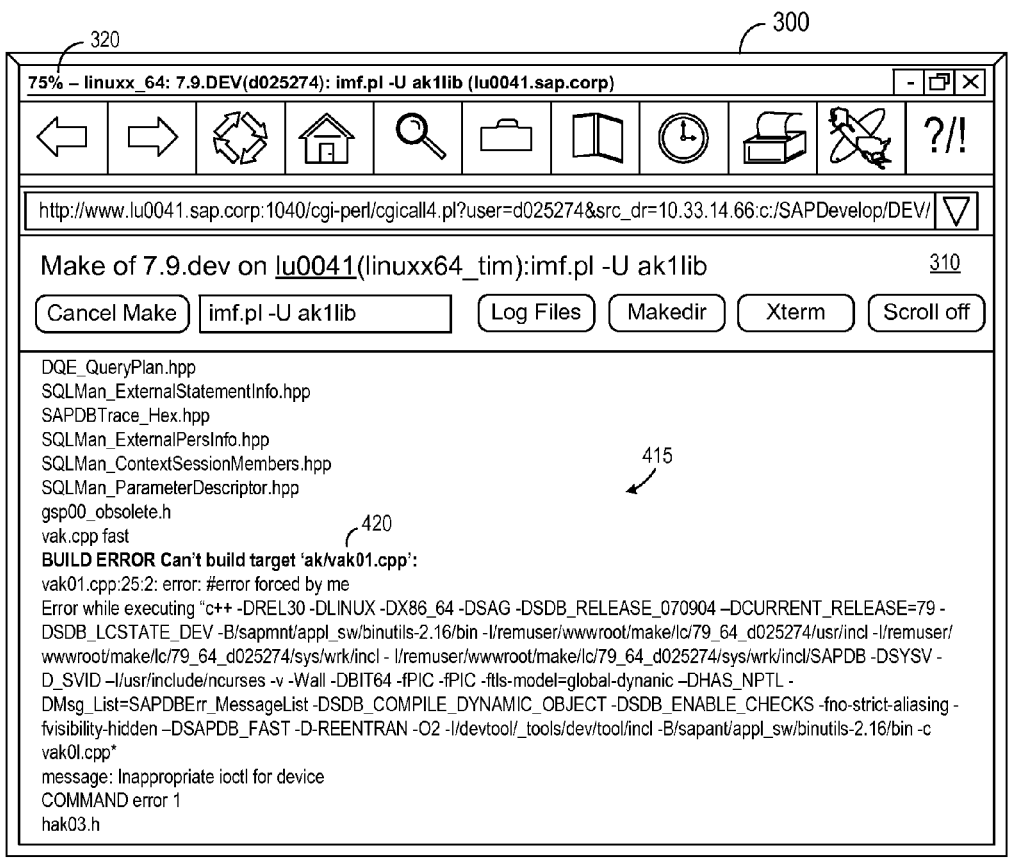
FIG. 4 is a view of a Web page including build output and displayed by a Web browser according to some embodiments.

FIG. 4 illustrates Web page 310 after the time represented in FIG. 3. Status bar 320 now indicates that the build is 75% complete, and Web page 310 includes additional build output 415 transmitted at S240. Output 415 includes error message 420, which is advantageously formatted to be more visible than the other lines of output 415.

Figure 5:
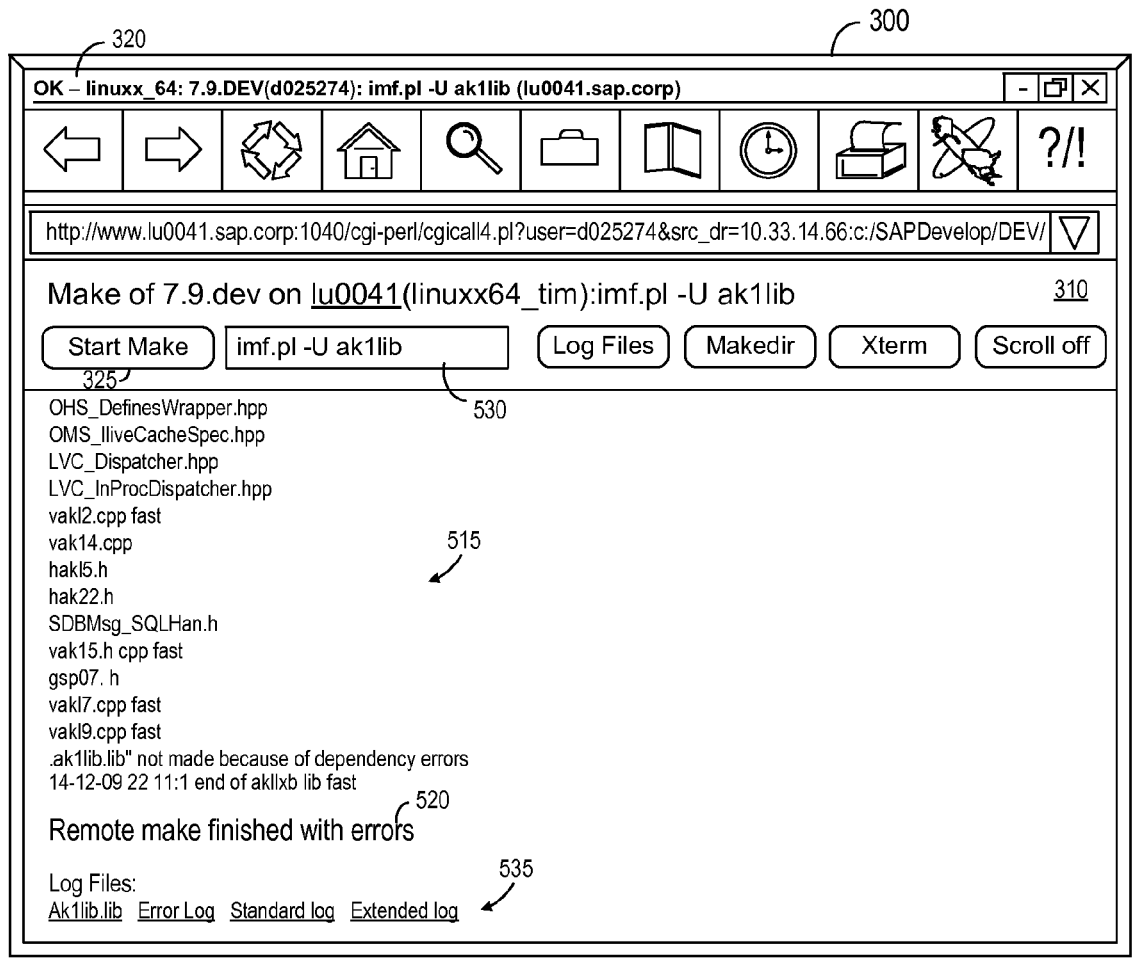
FIG. 5 is a view of a Web page including build output and displayed by a Web browser according to some embodiments.
Figure 6:
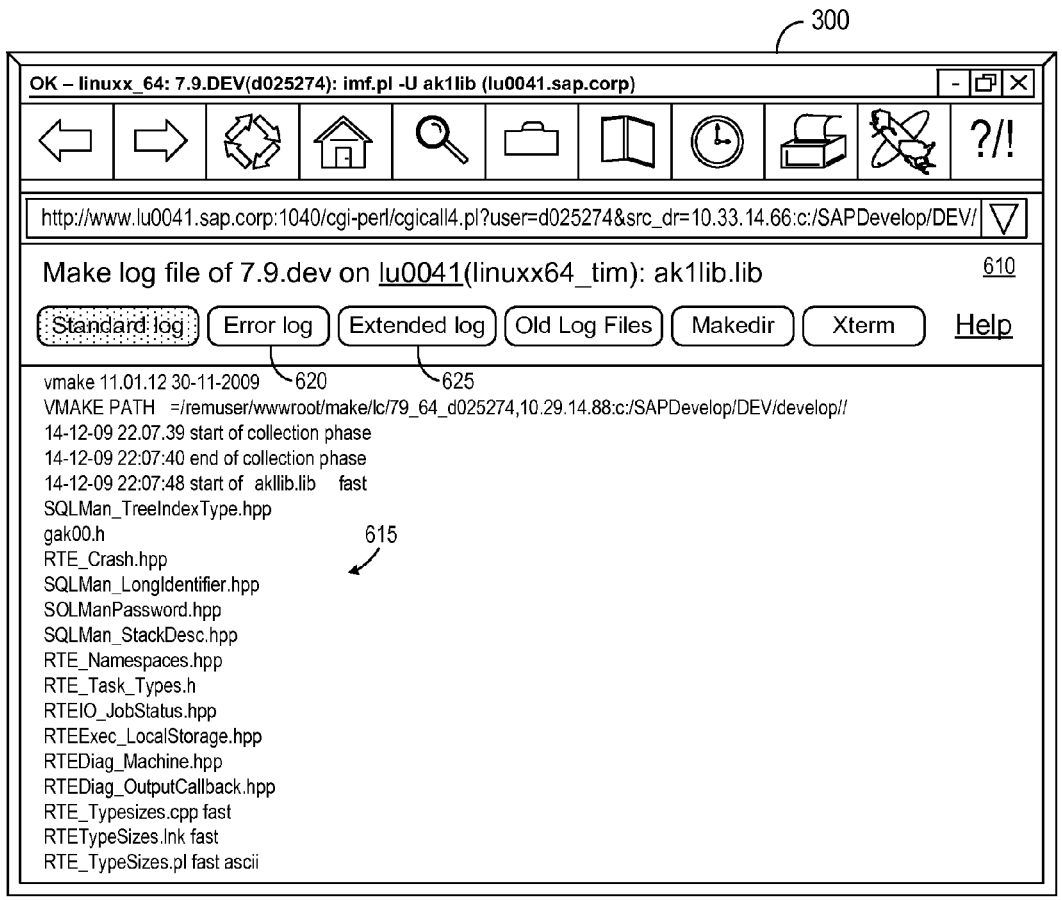
FIG. 6 is a view of a Web page including a portion of a log file and displayed by a Web browser according to some embodiments.

FIG. 5 illustrates Web page 310 after completion of the process depicted in FIGS. 3 and 4. Status bar 320 now indicates that the build is complete, and Web page 310 includes additional build output 515. Output 515 includes message 520 to provide a brief summary of the build. Web page 310 also includes Start Make button 525. Upon selection of button 525, a new request is generated and transmitted to Web server 122, and flow proceeds as described above with respect to process 200.

The new request may be identical to the previous request. However, a developer may modify the command line parameters within field 530 prior to selecting button 525. Accordingly, selection of Start Make button causes creation and transmission of a new and different request.

Web page 535 also includes hyperlinks 535 for accessing log files created during S230. The types of entries within the log files may be determined based on the command line parameters shown in field 530. For purposes of the present example, it will be assumed that the "Standard log" link 535 is selected within Web page 310. Accordingly, Web browser 112 transmits a corresponding request to Web server 122. Web server 122 may return Web page 610 of FIG. 6 in response to the request.

Figure 7:
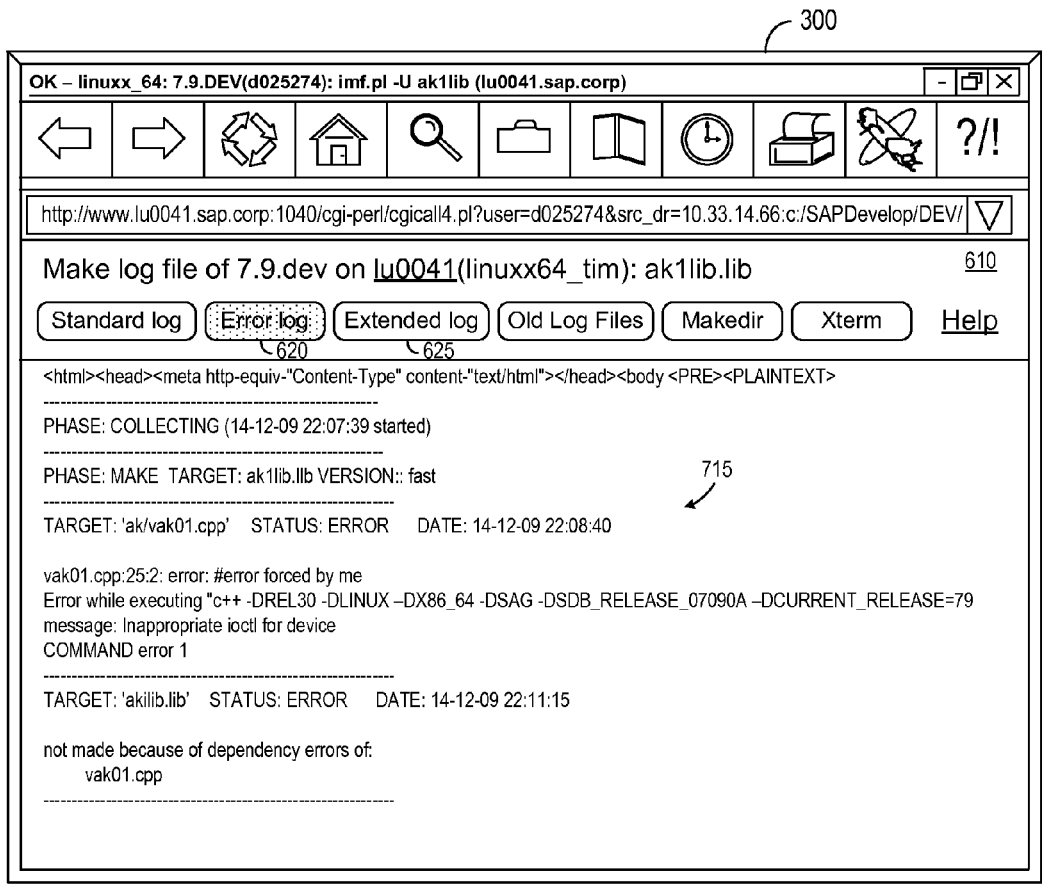
FIG. 7 is a view of a Web page including a portion of a log file and displayed by a Web browser according to some embodiments.
Figure 8:
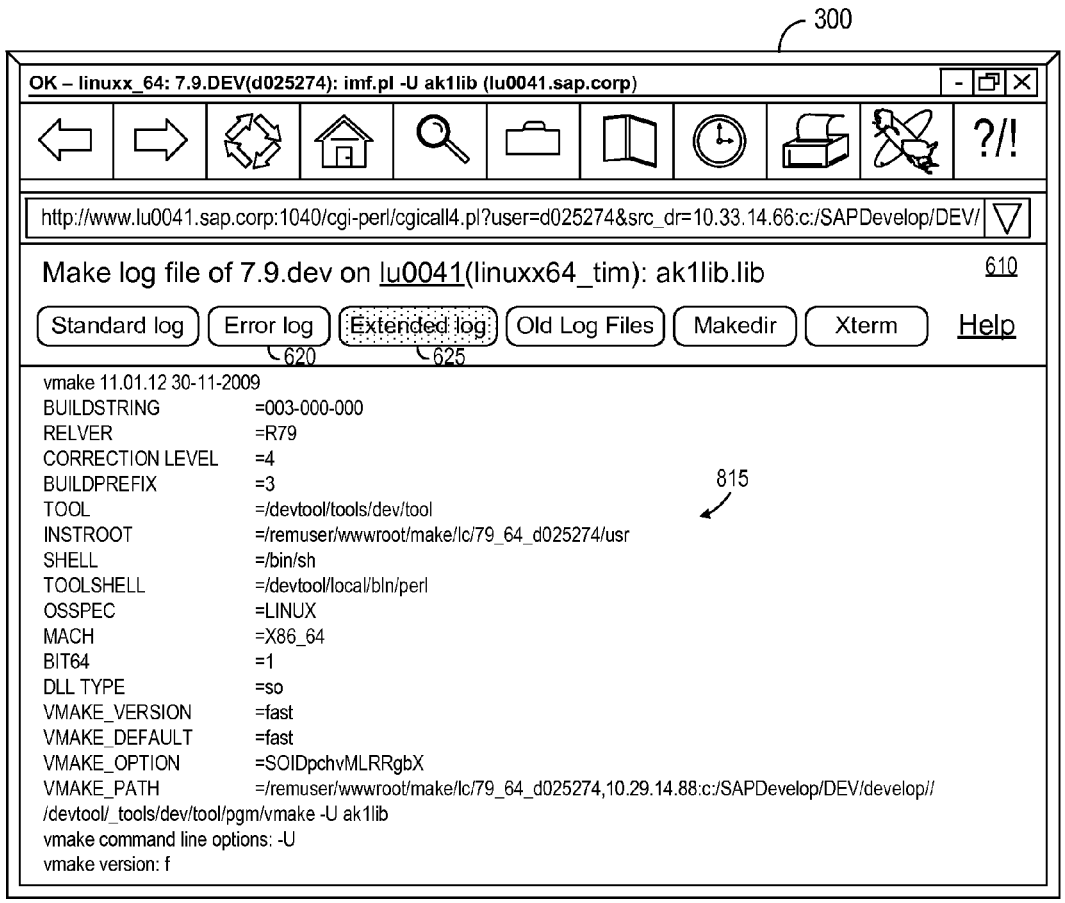
FIG. 8 is a view of a Web page including a portion of a log file and displayed by a Web browser according to some embodiments.

Web page 610 includes log file entries 615. A developer may view log file entries 615 to evaluate the corresponding build. Web page 610 also includes buttons 620 and 630 for accessing other log files associated with the present build. FIG. 7 illustrates an example of Web page 710 received from Web server 122 in response to selection of button 620, and FIG. 8 illustrates an example of Web page 810 received from Web server 122 in response to selection of button 625. Web pages 710 and 810 include log file entries 715 of an error log and log file entries 815 of an extended log, respectively.

Figure 9:
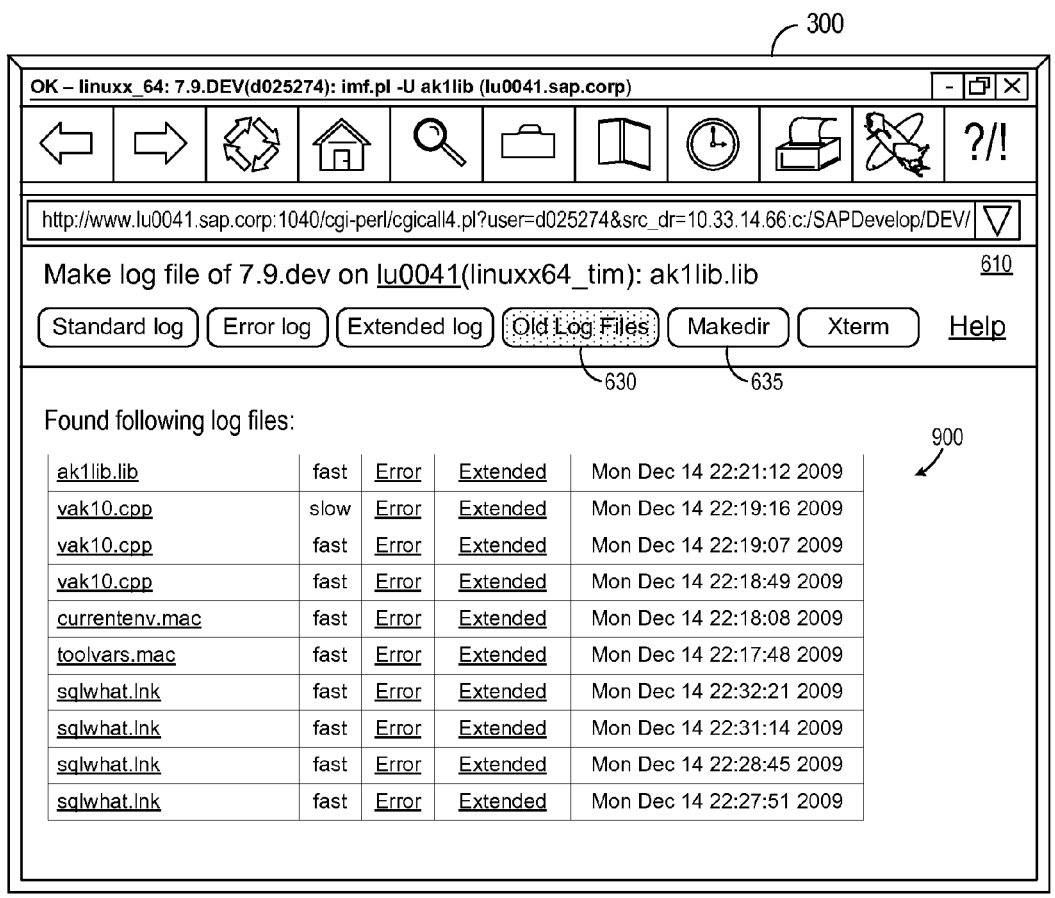
FIG. 9 is a view of a Web page including links to log files and displayed by a Web browser according to some embodiments.

FIG. 9 shows Web page 610 after selection of Old Log Files button 630. Links 900 of Web page 610 include a set of hyperlinks to a log file, an error log file and an extended log file for each of several builds performed by build server 120. These log files are stored in build server 120. Selection of a hyperlink of hyperlinks 900 results in reception and display of the entries of the corresponding log file.

Figure 10:
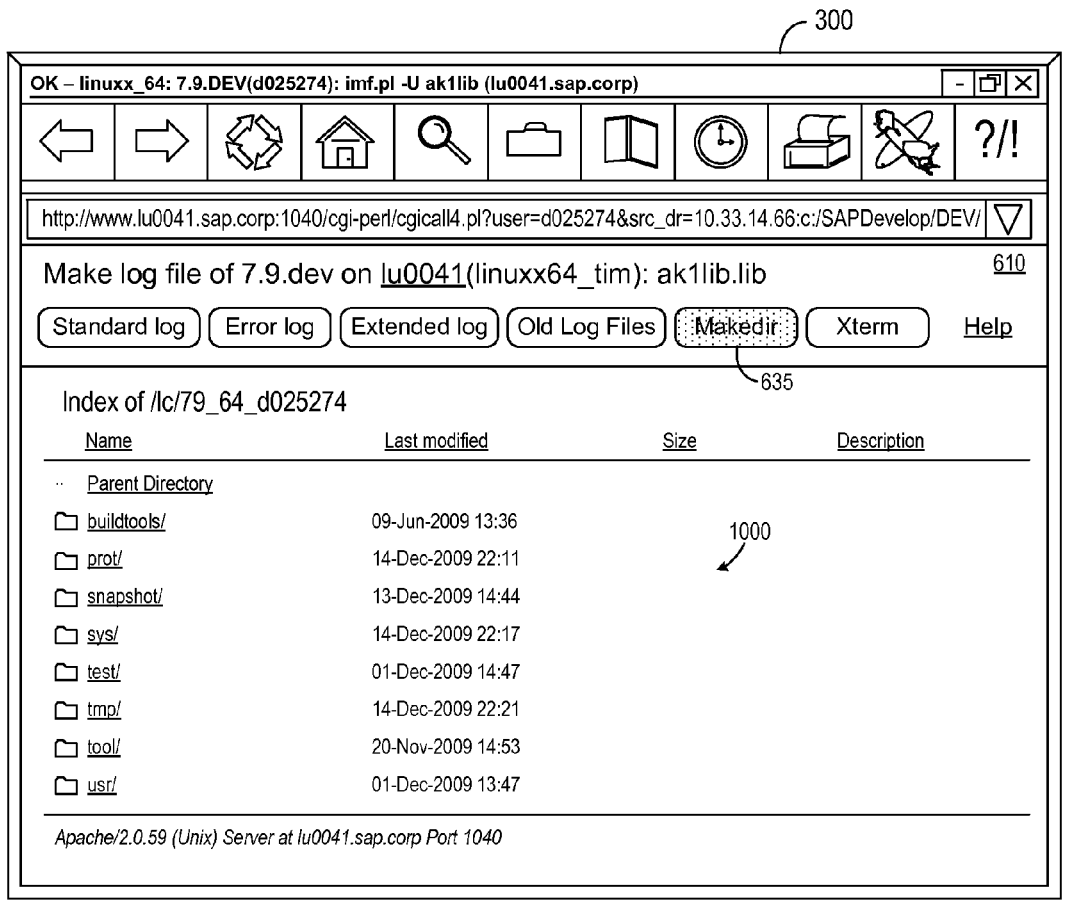
FIG. 10 is a view of a Web page including links to build directory folders and displayed by a Web browser according to some embodiments.

FIG. 10 shows Web page 610 after selection of Makedir button 635. Web page 610 shows one level 1000 of a structure of a build directory corresponding to the current compilation. Each folder is represented by a hyperlink which allows drilling down into the folder contents. Again, the information of FIG. 10 is received from the build server of the current build (e.g., build server 122).

Figure 11:
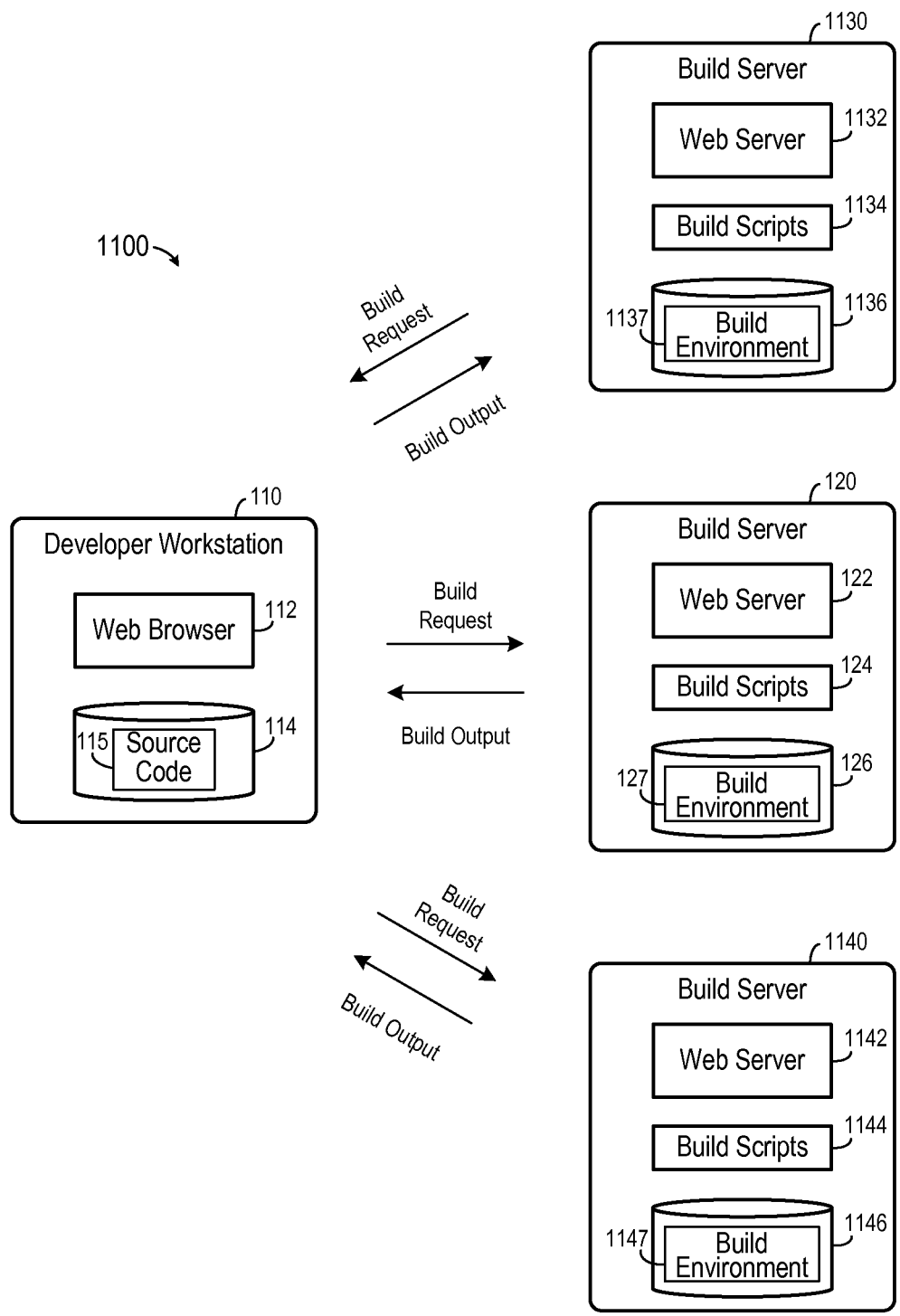
FIG. 11 is a block diagram of a system according to some embodiments.

FIG. 11 illustrates system 1100 according to some embodiments. Workstation 110 and build server 120 may be implemented as described above. Also shown are build servers 1130 and 1140. Build servers 120, 1130 and 1140 may each be associated with a different computing platform. System 1100 may be used to manage the building of software on each of the different computing platforms. For example, each of build servers 120, 1130 and 1140 may execute process 200 with respect to the same makefile or module files stored on workstation 1100.

Developer workstation 110 may issue requests to each of build servers 120, 1130 and 1140 using techniques similar to those described above. For example, a developer may enter the following from a command line:
>webmake <platform1>,<platform2>, <platform3> <module or makefile>,
where <platform1>,<platform2>, <platform3> indicate the computing platforms of build servers 120, 1130 and 1140. In some embodiments, builds may be executed on all computing platforms from the command line as follows:
>webmake all <module or makefile>

Again, workstation 110 includes program code that is executed based on the command line instruction to generate a request for each computing platform. In some embodiments, a different Web browser session (e.g., Web browser tab) is opened for each computing platform, and the request is transmitted to a Web server of each computing platform via a dedicated browser session.

Figure 12:
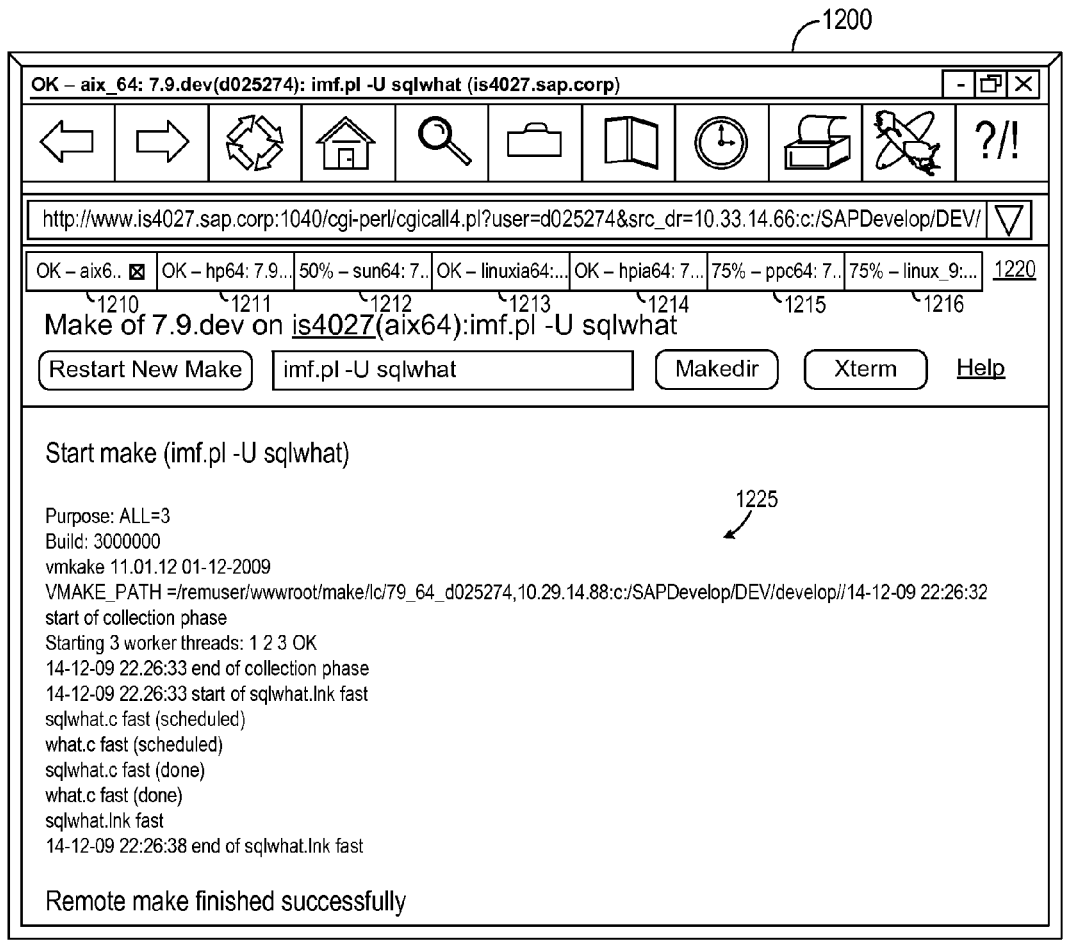
FIG. 12 is a view of a Web page including build output and displayed by a Web browser according to some embodiments.

For example, FIG. 12 shows Web browser interface 1200 including tabs 1210 through 1216, each of which represents a different browser session. Tab 1210 is active and therefore interface 1200 displays Web page 1220 corresponding to tab 1210. Web page 1220 was received from Web server "is4027.sap.corp", which corresponds to the computing platform "aix64". As described above with respect to S240, Web page 1220 includes build output 1225 resulting from a build based on source code identified by the filename "sq1what".

Each of tabs 1211 through 1216 is associated with a different computing platform. Accordingly, each of tabs 1211 through 1216 displays a Web page including build output resulting from builds on the associated computing platform. Each of tabs 1210 through 1216 displays the progress of its respective build. Systems such as illustrated in FIGS. 11 and 12 provide for efficient management of builds on multiple computing platforms.

Figure 13:
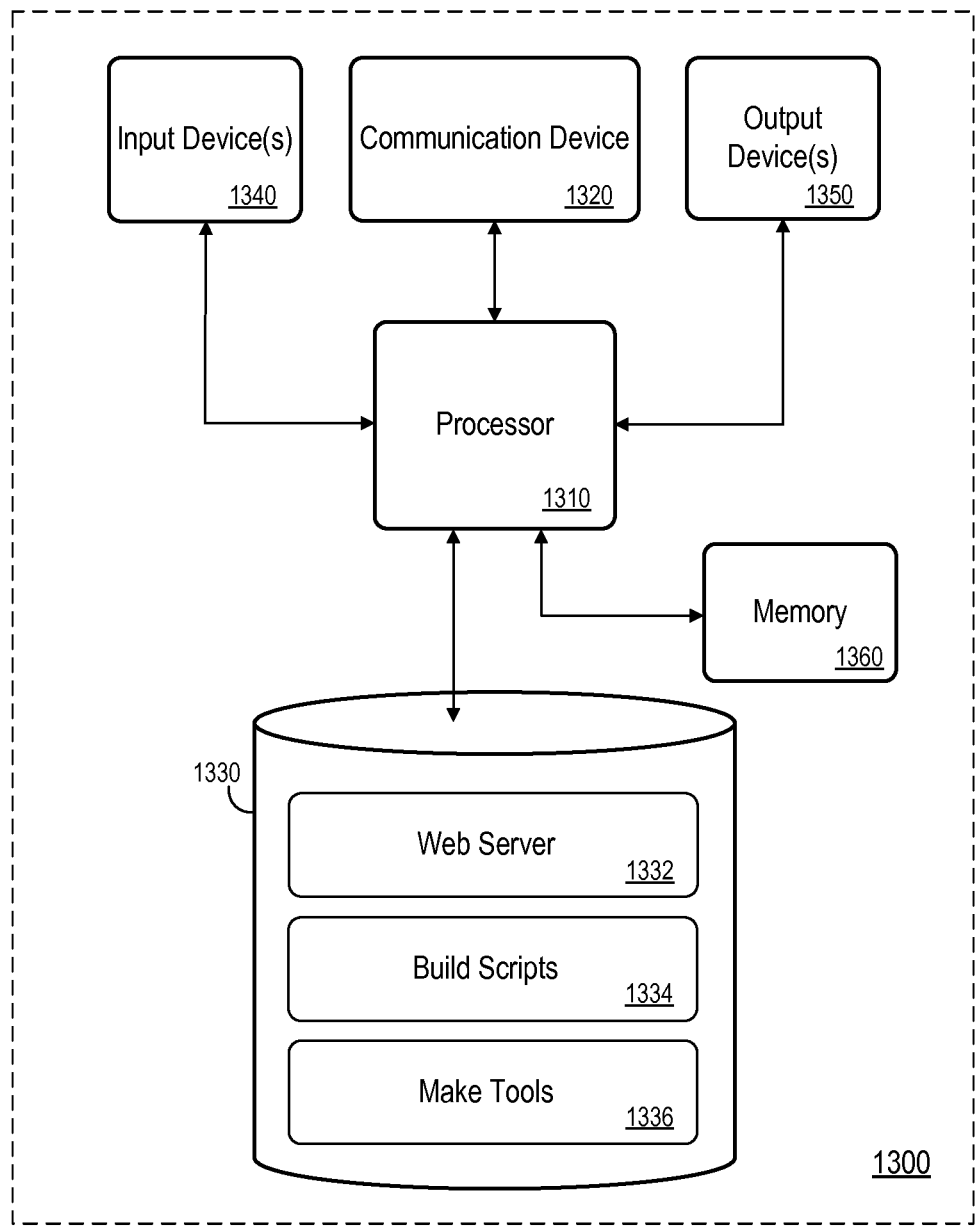
FIG. 13 is a block diagram of an apparatus according to some embodiments.

FIG. 13 is a block diagram of apparatus 1300 according to some embodiments. Apparatus 1300 may comprise a general-purpose computing apparatus and may execute program code to perform any of the functions described herein. Apparatus 1300 may comprise an implementation of build server 120. Apparatus 1300 may include other unshown elements according to some embodiments.

Apparatus 1300 includes processor 1310 operatively coupled to communication device 1320, data storage device 1330, one or more input devices 1340, one or more output devices 1350 and memory 1360. Communication device 1320 may facilitate communication with an external network such as the Internet. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into apparatus 1300. Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise RAM.

Program code of Web server 1332, build scripts 1334 and make tools 1336 may be executed by processor 1310 to cause apparatus 1300 to perform any one or more of the processes described herein. Embodiments are not limited to execution of these processes by a single apparatus. Data storage device 1330 may also store data and other program code for providing additional functionality and/or which are necessary for operation thereof, such as device drivers, operating system files, etc.

Embodiments described herein are solely for the purpose of illustration. Those in the art will recognize other embodiments may be practiced with modifications and alterations to that described above.

What is claimed is:

1. A system comprising:
   a first device comprising:
      a first memory system storing first processor-executable program code; and
      a first processor to execute the first processor-executable program code in order to cause the first device to:
         receive a request from a remote Web browser identifying a remote location of source code and a computing platform;
         in response to the request,
            create a build environment in the first memory system corresponding to the identified computing platform;
            retrieve the source code from the remote location;
            execute a build based on the source code, using the build environment, to create, in the first memory system, build output, a log file, and a build directory associated with the build; and
            transmit, to the remote Web browser, a first Web page including the build output;
         receive a second request from the remote Web browser to browse the build directory;
         in response to the second request, transmit, to the remote Web browser, a second Web page including a link to at least one folder of the build directory;
         receive a third request from the remote Web browser to view the log file; and
         in response to the third request, transmit, to the remote Web browser, a third Web page including at least a portion of the log file,
         wherein the first Web page comprises a link selectable to issue the third request.

2. A system according to claim 1, further comprising:
   a second device comprising:
      a second memory system storing second processor-executable program code and the source code; and
      a second processor to execute the second processor-executable program code in order to cause the second device to:
         transmit the source code to the first device.

3. A system according to claim 1, further comprising:
   a second device comprising:
      a second memory system storing second processor-executable program code; and
      a second processor to execute the second processor-executable program code in order to cause the second device to:
         receive the Web page including the build output; and
         display the Web page including the build output.

4. A system according to claim 1, further comprising:
   a second device comprising:
      a second memory system storing second processor-executable program code; and
      a second processor to execute the second processor-executable program code in order to cause the second device to:
         receive a fourth request from the remote Web browser identifying the remote location of the source code and a second computing platform;
         in response to the fourth request,
            create a second build environment in the second memory system corresponding to the identified second computing platform;
            retrieve the source code from the remote location;
            execute a second build based on the source code, using the second build environment, to create, in the first memory system, second build output and a second build directory associated with the second build; and
            transmit, to the remote Web browser, a third Web page including the second build output;
         receive a fifth request from the remote Web browser to browse the second build directory; and
         in response to the fifth request, transmit, to the remote Web browser, a third Web page including a link to at least one folder of the second build directory.

5. A non-transitory medium storing processor-executable program code, the program code executable by a processor of a computing device to cause the computing device to:
   receive a request from a remote Web browser identifying a remote location of source code and a computing platform;
   in response to the request,
      create a build environment corresponding to the identified computing platform;
      retrieve the source code from the remote location;
      execute a build based on the source code, using the build environment, to create, in the first memory system, build output, a log file, and a build directory associated with the build; and
      transmit, to the remote Web browser, a first Web page including the build output;
   receive a second request from the remote Web browser to browse the build directory;
   in response to the second request, transmit, to the remote Web browser, a second Web page including a link to at least one folder of the build directory;
   receive a third request from the remote Web browser to view the log file; and in response to the third request, transmit, to the remote Web browser, a third Web page including at least a portion of the log file, wherein the first Web page comprises a link selectable to issue the third request.

6. A non-transitory medium according to claim 5, the program code further executable by a processor of a computing device to cause the computing device to:

receive the source code from a first remote device executing the Web browser.

7. A non-transitory medium according to claim 5, the program code further executable by a processor of a computing device to cause the computing device to:

receive a fourth request from the remote Web browser identifying the remote location of the source code and a second computing platform;

in response to the fourth request, create a second build environment in the second memory system corresponding to the identified second computing platform;

retrieve the source code from the remote location;

execute a second build based on the source code, using the second build environment, to create, in the first memory system, second build output and a second build directory associated with the second build output; and transmit, to the Web browser, a third Web page including the second build output;

receive a fifth request from the remote Web browser to browse the second build directory; and in response to the fifth request, transmit, to the remote Web browser, a third Web page including a link to at least one folder of the second build directory.

8. A method comprising:

receiving a request from a remote Web browser identifying a remote location of source code and a computing platform;

in response to the request, creating a build environment corresponding to the identified computing platform;

retrieving the source code from the remote location;

executing a build based on the source code, using the build environment, to create, in the first memory system, build output, a log file, and a build directory associated with the build; and transmitting, to the remote Web browser, a first Web page including the build output;

receiving a second request from the remote Web browser to browse the build directory;

in response to the second request, transmitting, to the remote Web browser, a second Web page including a link to at least one folder of the build directory;

receiving a third request from the remote Web browser to view the log file; and in response to the third request, transmitting, to the remote Web browser, a third Web page including at least a portion of the log file, wherein the first Web page comprises a link selectable to issue the third request.

9. A method according to claim 8, the program code further comprising:

program code to receive the source code from a first device executing the Web browser.

10. A method according to claim 8, further comprising:

receiving a fourth request from the remote Web browser identifying the remote location of the source code and a second computing platform;

in response to the fourth request, creating a second build environment in the second memory method corresponding to the identified second computing platform;

retrieving the source code from the remote location;

executing a second build based on the source code, using the second build environment, to create, in the first memory system, second build output and a second build directory associated with the build; and transmitting, to the Web browser, a third Web page including the second build output;

receiving a fifth request from the remote Web browser to browse the second build directory; and in response to the fifth request, transmitting, to the remote Web browser, a fourth Web page including a link to at least one folder of the second build directory.

* * * * *